(12) United States Patent
Osamoto et al.

(10) Patent No.: US 7,787,541 B2
(45) Date of Patent: Aug. 31, 2010

(54) DYNAMIC PRE-FILTER CONTROL WITH SUBJECTIVE NOISE DETECTOR FOR VIDEO COMPRESSION

(75) Inventors: Akira Osamoto, Ibaraki (JP); Osamu Koshiba, Ibaraki (JP)

(73) Assignee: Texas Instruments Incorporated, Dallas, TX (US)

( * ) Notice: Subject to any disclaimer, the term of this patent is extended or adjusted under 35 U.S.C. 154(b) by 1365 days.

(21) Appl. No.: 11/244,264

(22) Filed: Oct. 5, 2005

(65) Prior Publication Data

US 2007/0076803 A1 Apr. 5, 2007

(51) Int. Cl.
*H04N 7/12* (2006.01)
(52) U.S. Cl. .................... 375/240.29; 382/275
(58) Field of Classification Search ............. 375/240.29
See application file for complete search history.

(56) References Cited

U.S. PATENT DOCUMENTS

| | | | |
|---|---|---|---|
| 4,504,863 A * | 3/1985 | Lacoste ................ 348/618 |
| 4,723,166 A * | 2/1988 | Stratton ................ 348/620 |
| 5,185,664 A * | 2/1993 | Darby ................ 348/620 |
| 5,367,340 A * | 11/1994 | Spencer ................ 348/607 |
| 5,430,487 A * | 7/1995 | Naimpally ............ 375/240.25 |
| 5,442,401 A * | 8/1995 | Murakami et al. ..... 375/240.18 |
| 5,469,268 A * | 11/1995 | Neuhoff et al. ............ 358/3.27 |
| 5,475,497 A * | 12/1995 | Neuhoff et al. ............ 358/406 |
| 5,543,848 A * | 8/1996 | Murakami et al. ....... 348/416.1 |
| 5,646,961 A * | 7/1997 | Shoham et al. ............. 375/243 |
| 5,719,966 A * | 2/1998 | Brill et al. ................ 382/260 |
| 5,790,692 A * | 8/1998 | Price et al. ................ 382/133 |
| 5,875,003 A * | 2/1999 | Kato et al. ................ 348/699 |
| 5,903,680 A * | 5/1999 | De Haan et al. ............. 382/265 |
| 5,978,033 A * | 11/1999 | Ohnishi ................ 375/240.16 |
| 6,026,190 A * | 2/2000 | Astle ................ 382/232 |
| 6,064,776 A * | 5/2000 | Kikuchi et al. ............. 382/260 |
| 6,108,455 A * | 8/2000 | Mancuso ................ 382/261 |
| 6,122,314 A * | 9/2000 | Bruls et al. ............ 375/240.12 |
| 6,269,123 B1 * | 7/2001 | Fujishiro et al. ....... 375/240.29 |
| 6,298,090 B1 * | 10/2001 | Challapali et al. ...... 375/240.29 |
| 6,335,990 B1 * | 1/2002 | Chen et al. ................ 382/261 |
| 6,339,657 B1 * | 1/2002 | Yamaguchi et al. ......... 382/239 |
| 6,381,373 B1 * | 4/2002 | Suzuki et al. ................ 382/263 |
| 6,466,625 B1 * | 10/2002 | Kobayashi et al. ..... 375/240.29 |
| 6,731,815 B1 * | 5/2004 | Hu ................ 382/240 |
| 6,744,818 B2 * | 6/2004 | Sheraizin et al. ........ 375/240.29 |
| 6,825,886 B2 * | 11/2004 | Kobayashi et al. ........ 348/405.1 |
| 6,847,738 B1 * | 1/2005 | Scognamiglio et al. ..... 382/260 |
| 6,954,287 B1 * | 10/2005 | Balasubramanian et al. . 358/1.9 |
| 6,996,186 B2 * | 2/2006 | Ngai et al. ............ 375/240.29 |
| 7,046,307 B1 * | 5/2006 | Hui ................ 348/700 |
| 7,295,616 B2 * | 11/2007 | Sun et al. ................ 375/240.27 |
| 7,548,277 B2 * | 6/2009 | Babonneau et al. ......... 348/607 |

(Continued)

*Primary Examiner*—Sath V Perungavoor
(74) *Attorney, Agent, or Firm*—Robert D. Marshall, Jr.; W. James Brady; Frederick J. Telecky, Jr.

(57) ABSTRACT

Pre filtering is commonly used in video encoding to remove undesirable noise from video sources. Without a pre filter, the noise degrades the performance of a video encoder by wasting a number of bits to represent the noise itself, and by introducing encoding artifacts such as blocking and ringing noise. However, excess use of pre filtering will degrade subjective visual quality. This invention employs an automatic pre filter control using a subjective noise detector capable of measuring noise that strongly correlates to subjective video quality.

12 Claims, 4 Drawing Sheets

U.S. PATENT DOCUMENTS

| | | | |
|---|---|---|---|
| 2002/0122494 A1* | 9/2002 | Sheraizin et al. | 375/240.29 |
| 2002/0141503 A1* | 10/2002 | Kobayashi et al. | 375/240.27 |
| 2002/0150166 A1* | 10/2002 | Johnson | 375/240.29 |
| 2002/0186894 A1* | 12/2002 | Ferguson | 382/261 |
| 2003/0031377 A1* | 2/2003 | Ahn | 382/268 |
| 2005/0036558 A1* | 2/2005 | Dumitras et al. | 375/240.29 |
| 2005/0128356 A1* | 6/2005 | Babonneau et al. | 348/607 |
| 2005/0135700 A1* | 6/2005 | Anderson | 382/261 |
| 2006/0147124 A1* | 7/2006 | Edler et al. | 382/260 |
| 2007/0076803 A1* | 4/2007 | Osamoto et al. | 375/240.29 |
| 2008/0089429 A1* | 4/2008 | Lin | 375/240.27 |

* cited by examiner

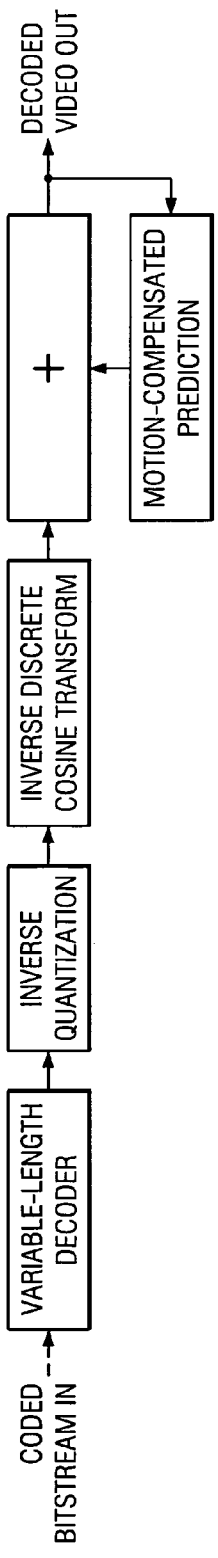
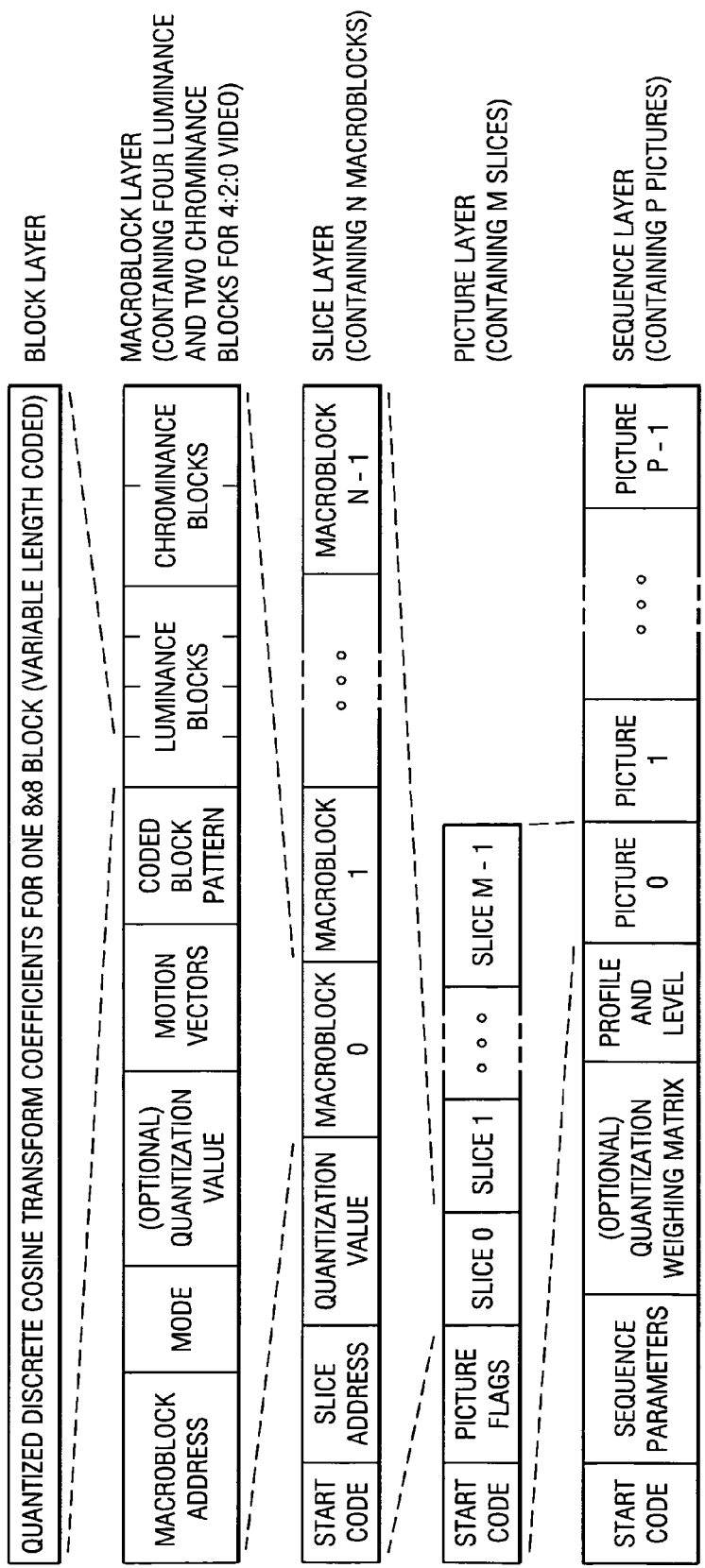
FIG. 2B
FIG. 3

DYNAMIC PRE-FILTER CONTROL WITH SUBJECTIVE NOISE DETECTOR FOR VIDEO COMPRESSION

TECHNICAL FIELD OF THE INVENTION

The technical field of this invention is digital video compression.

BACKGROUND OF THE INVENTION

Recent progress in digital technology has made the widespread use of compressed digital video signals practical. Standardization has been very important in the development of common compression methods to be used in the new services and products that are now possible. This allows the new services to interoperate with each other and encourages the investment needed in integrated circuits to make the technology affordable.

MPEG (Moving Picture Experts Group) was started in 1988 as a working group within ISO/IEC (International Standardization Organization/International Electrotechnical Commission) with the aim of defining standards for digital compression of audio-visual signals. MPEG's first project, MPEG-1, was published in 1993 as ISO/IEC 11172. It is a three-part standard defining audio and video compression coding methods and a multiplexing system for interleaving audio and video data so that they can be played back together. MPEG-1 principally supports video coding up to about 1.5 Mbit/s giving quality similar to VHS and stereo audio at 192 bit/s. It is used in the CD-i (CD-interactive) and Video-CD systems for storing video and audio on CD-ROM.

During 1990, MPEG recognized the need for a second, related standard for coding video for broadcast formats at higher data rates. The MPEG-2 standard is capable of coding standard-definition television at bit rates from about 3-15 Mbit/s and high-definition television at 15-30 Mbit/s. MPEG-2 extends the stereo audio capabilities of MPEG-1 to multi-channel surround sound coding. MPEG-2 decoders will also decode MPEG-1 bitstreams.

MPEG-2 aims to be a generic video coding system supporting a diverse range of applications. Different algorithmic tools, developed for many applications, have been integrated into the full standard. To implement all the features of the standard in all decoders is unnecessarily complex and a waste of bandwidth, so a small number of subsets of the full standard, known as profiles and levels, have been defined. A profile is a subset of algorithmic tools and a level identifies a set of constraints on parameter values (such as picture size and bit rate). A decoder which supports a particular profile and level is only required to support the corresponding subset of the full standard and set of parameter constraints.

Television services in the United States broadcast video at a frame rate of slightly less than 30 Hz. Each frame consists of two interlaced fields, giving a field rate of slightly less than 60 Hz. The first field of each frame contains only the odd numbered lines of the frame (numbering the top frame line as line 1), and the second field contains only the even numbered lines of the frame. It is important to note that one interlaced frame contains fields from two instants in time.

In video systems other than television, non-interlaced video is commonplace (for example, most computers output non-interlaced video). In non-interlaced video, all the lines of a frame are sampled at the same instant in time. Non-interlaced video is also termed progressively scanned or sequentially scanned video.

The red, green and blue (RGB) signals commonly used can be equivalently expressed as luminance (Y) and chrominance (UV) components. The chrominance bandwidth may be reduced relative to the luminance without significantly affecting the picture quality. For standard definition video, CCIR (Consultative Committee for International Radio) 601 defines how the component (YUV) video signals can be sampled and digitized to form discrete pixels. The terms 4:2:2 and 4:2:0 are often used to describe the sampling structure of the digital picture. 4:2:2 means the chrominance is horizontally subsampled by a factor of two relative to the luminance; 4:2:0 means the chrominance is horizontally and vertically subsampled by a factor of two relative to the luminance.

Using 8 bits for each Y, U or V pixel, the uncompressed bit rates are over 150 Mbits/second.

MPEG-2 is capable of compressing the bit rate of standard-definition 4:2:0 video down to about 3-15 Mbit/s. At the lower bit rates in this range, the artifacts introduced by the MPEG-2 coding and decoding process become increasingly objectionable.

In order to improve encoded quality, and additional pre filtering step is usually implemented at the input to the encoder. The purpose of the pre filter is to reduce or eliminate any high frequency noise that may be present in the input video source. If present, such noise would degrade the performance of the video encoder as the encoder would waste available bits in attempting to encode the noise itself.

In low bit rate applications, pre filtering is also used to reduce the high frequency components of the source video to prevent blocking and ringing noise in the decoder. Blocking noise is the noise artifacts at the encoded block boundaries, while ringing and mosquito noise is usually due to excess high frequency components and is evident within the encoded blocks.

The pre filter is usually implemented as a low pass filter. The amount of filtering is critical, as too much filtering will degrade the overall image quality. The invention described herein shows an effective feedback mechanism that controls the amount of filtering based on a noise measure that strongly relates to subjective video quality.

SUMMARY OF THE INVENTION

This invention involves adaptive pre filtering of video signals previous to encoding. A variable low pass filter is employed, and the amount of filtering is controlled by a subjective noise detector. This detector directly estimates the subjective picture quality, and then adjusts the pre filter to optimize the picture to be encoded.

BRIEF DESCRIPTION OF THE DRAWINGS

These and other aspects of this invention are illustrated in the drawings, in which:

"FIGS. 2A and 2B are block diagrams of a typical MPEG coder and decoder;"

FIG. 3 shows the MPEG-2 bit stream structure;

DETAILED DESCRIPTION OF PREFERRED EMBODIMENTS

Video compression systems operate by removing redundant information from the signal at the coder prior to transmission and re-inserting it at the decoder. A coder and decoder pair are referred to as a codec. In video signals, two distinct kinds of redundancy can be identified.

Spatial and temporal redundancy: Pixel values are not independent, but are correlated with their neighbors both within the same frame and across frames. So, to some extent, the value of a pixel is predictable given the values of neighboring pixels.

Psycho visual redundancy: The human eye has a limited response to fine spatial detail, and is less sensitive to detail near object edges or around scene changes. Consequently, some artifacts introduced into the decoded picture by the bit rate reduction process may not be visible to the human eye.

Two of the main approaches employed in MPEG codecs are intra-frame Discrete Cosine Transform (DCT) coding and motion-compensated inter-frame prediction.

Figure 1:
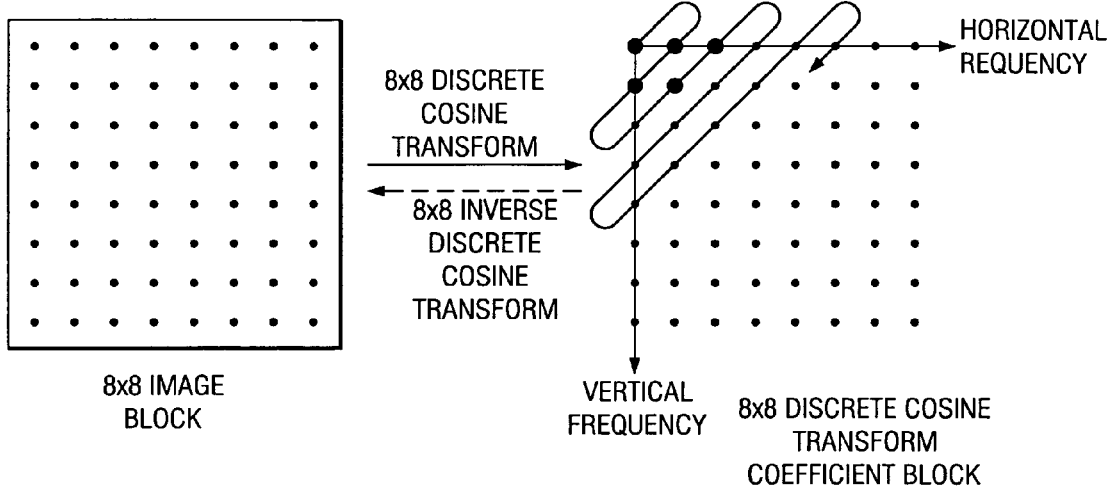
FIG. 1 shows the DCT/IDCT scanning in MPEG.

In Intra-frame DCT coding s two-dimensional DCT is performed on small blocks (8×8 pixels) of each component of the picture to produce blocks of DCT coefficients as shown in FIG. 1. The magnitude of each DCT coefficient indicates the contribution of a particular combination of horizontal and vertical spatial frequencies to the original picture block. The coefficient corresponding to zero horizontal and vertical frequency is called the DC coefficient. In FIG. 1, the pixel value and DCT coefficient magnitude are represented by dot size.

The DCT doesn't directly reduce the number of bits required to represent the block. In fact for an 8×8 block of 8 bit pixels, the DCT produces an 8×8 block of 11 bit coefficients (the range of coefficient values is larger than the range of pixel values.) The reduction in the number of bits follows from the observation that, for typical blocks from natural images, the distribution of coefficients is non-uniform. The transform tends to concentrate the energy into the low-frequency coefficients and many of the other coefficients are near-zero. The bit rate reduction is achieved by not transmitting the near-zero coefficients and by quantizing and coding the remaining coefficients as described below. The non-uniform coefficient distribution is a result of the spatial redundancy present in the original image block.

Quantization: The function of the coder is to transmit the DCT block to the decoder, in a bit rate efficient manner, so that it can perform the inverse transform to reconstruct the image. It has been observed that the numerical precision of the DCT coefficients may be reduced while still maintaining good image quality at the decoder. Quantization is used to reduce the number of possible values to be transmitted, reducing the required number of bits.

The degree of quantization applied to each coefficient is weighted according to the visibility of the resulting quantization noise to a human observer. In practice, this results in the high-frequency coefficients being more coarsely quantized than the low-frequency coefficients. Note that the quantization noise introduced by the coder is not reversible in the decoder, making the coding and decoding process lossy.

Coding: The serialization and coding of the quantized DCT coefficients exploits the likely clustering of energy into the low-frequency coefficients and the frequent occurrence of zero-value coefficients. The block is scanned in a diagonal zigzag pattern starting at the DC coefficient to produce a list of quantized coefficient values, ordered according to the scan pattern.

The list of values produced by scanning is entropy coded using a variable-length code (VLC). Each VLC code word denotes a run of zeros followed by a non-zero coefficient of a particular level. VLC coding recognizes that short runs of zeros are more likely than long ones and small coefficients are more likely than large ones. The VLC allocates code words which have different lengths depending upon the probability with which they are expected to occur. To enable the decoder to distinguish where one code ends and the next begins, the VLC has the property that no complete code is a prefix of any other.

FIG. 1 shows the zigzag scanning process, using the scan pattern common to both MPEG-1 and MPEG-2. MPEG-2 has an additional alternate scan pattern intended for scanning the quantized coefficients resulting from interlaced source pictures.

Motion-compensated inter-frame prediction exploits temporal redundancy by attempting to predict the frame to be coded from a previous reference frame. The prediction cannot be based on a source picture because the prediction has to be repeatable in the decoder, where the source pictures are not available (the decoded pictures are not identical to the source pictures because the bit rate reduction process introduces small distortions into the decoded picture.) Consequently, the coder contains a local decoder which reconstructs pictures exactly as they would be in the decoder, from which predictions can be formed.

The simplest inter-frame prediction of the block being coded is that which takes the co-sited (i.e. the same spatial position) block from the reference picture. Naturally this makes a good prediction for stationary regions of the image, but is poor in moving areas. A more sophisticated method, known as motion-compensated inter-frame prediction, is to offset any motion which has occurred between the block being coded and the reference frame and to use a shifted block from the reference frame as the prediction.

One method of determining the motion that has occurred between the block being coded and the reference frame is a block-matching search in which a large number of trial offsets are tested by the coder using the luminance component of the picture. The best offset is selected on the basis of minimum error between the block being coded and the prediction.

The bit rate overhead of using motion-compensated prediction is the need to convey the motion vectors required to predict each block to the decoder. For example, using MPEG-2 to compress standard-definition video to 6 Mbit/s, the motion vector overhead could account for about 2 Mbit/s during a picture making heavy use of motion-compensated prediction.

Figure 2A:
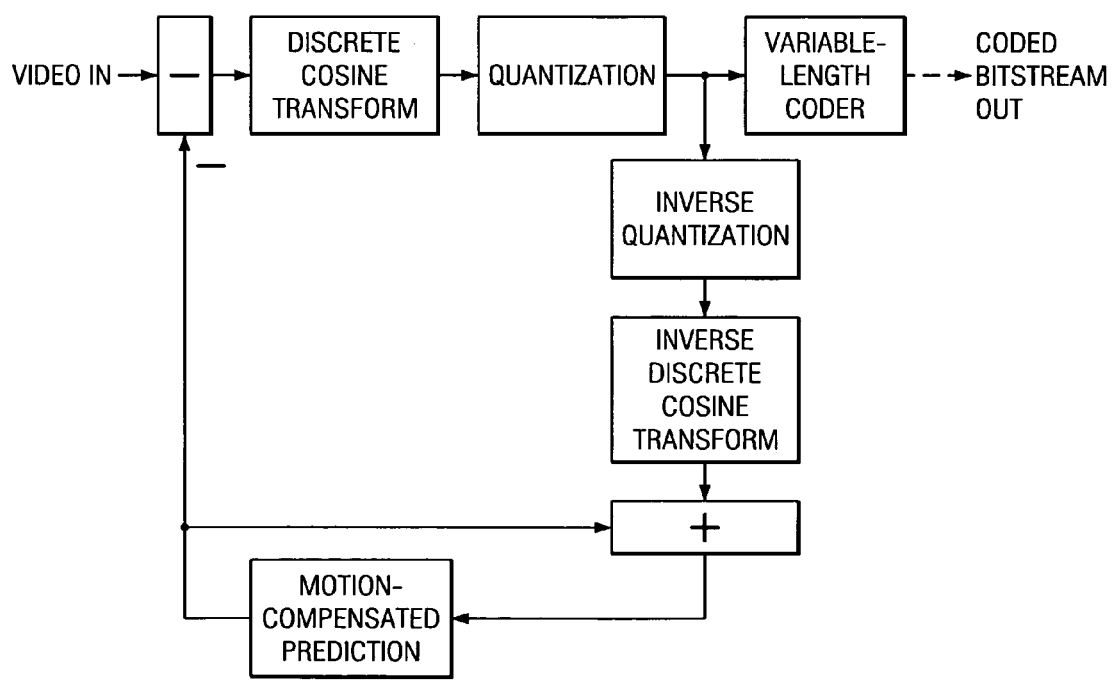

In an MPEG-2 system, the DCT and motion-compensated interframe prediction may be combined, as shown in FIG. 2. The coder subtracts the motion-compensated prediction from the source picture to form a prediction error picture. The prediction error is transformed with the DCT, the coefficients are quantized and these quantized values coded using a VLC. The coded luminance and chrominance prediction error is combined with side information required by the decoder, such as motion vectors and synchronizing information, and formed into a bit stream for transmission. FIG. 3 shows an outline of the MPEG-2 video bit stream structure.

In the decoder, the quantized DCT coefficients are reconstructed and inverse transformed to produce the prediction error. This is added to the motion-compensated prediction generated from previously decoded pictures to produce the decoded output.

In an MPEG-2 codec, the motion-compensated predictor shown in FIG. 2 supports many methods for generating a prediction. For example, the block may be forward predicted from a previous picture, backward predicted from a future picture, or bidirectionally predicted by averaging a forward and backward prediction. The method used to predict the block may change from one block to the next. Additionally, the two fields within a block may be predicted separately with their own motion vector, or together using a common motion vector. Another option is to make a zero-value prediction, such that the source image block rather than the prediction error block is DCT coded. For each block to be coded, the coder chooses between these prediction modes, trying to maximize the decoded picture quality within the constraints of the bit rate. The choice of prediction mode is transmitted to the decoder, with the prediction error, so that it may regenerate the correct prediction.

In MPEG-2, three picture types are defined. The picture type defines which prediction modes may be used to code each block.

Intra pictures (I-pictures) are coded without reference to other pictures. Moderate compression is achieved by reducing spatial redundancy, but not temporal redundancy. They can be used periodically to provide access points in the bit stream where decoding can begin.

Predictive pictures (P-pictures) can use the previous I- or P-picture for motion compensation and may be used as a reference for further prediction. Each block in a P-picture can either be predicted or intra-coded. By reducing spatial and temporal redundancy, P-pictures offer increased compression compared to I-pictures.

Bidirectionally-predictive pictures (B-pictures) can use the previous and next I or P pictures for motion-compensation, and offer the highest degree of compression. Each block in a B-picture can be forward, backward or bidirectionally predicted or intra-coded. To enable backward prediction from a future frame, the coder reorders the pictures from natural display order to bit stream order so that the B-picture is transmitted after the previous and next pictures it references. This introduces a reordering delay dependent on the number of consecutive B-pictures.

The different picture types typically occur in a repeating sequence, termed a Group of Pictures or GOP. A typical GOP in display order is:

$B_1 B_2 I_3 B_4 B_5 P_6 B_7 B_8 P_9 B_{10} B_{11} P_{12}$

The corresponding bit stream order is:

$I_3 B_1 B_2 P_6 B_4 B_5 P_9 B_7 B_8 P_{12} B_{10} B_{11}$

A regular GOP structure can be described with two parameters: N, which is the number of pictures in the GOP, and M, which is the spacing of P-pictures. The GOP given here is described as N=12 and M=3. MPEG-2 does not insist on a regular GOP structure. For example, a P picture following a scene change may be badly predicted since the reference picture for prediction is completely different from the picture being predicted. Thus, it may be beneficial to code it as an I picture instead.

For a given decoded picture quality, coding using each picture type produces a different number of bits. In a typical example sequence, a coded I picture was three times larger than a coded P picture, which was itself 50% larger than a coded B picture.

By removing much of the redundancy from the source images, the coder outputs a variable bit rate. The bit rate depends on the complexity and predictability of the source picture and the effectiveness of the motion-compensated prediction.

For many applications, the bit stream must be carried as a fixed bit rate stream. In these cases, a buffer must be placed between the coder and the output. The buffer is filled at a variable rate by the coder, and emptied at a constant rate by the transmitted stream. To prevent the buffer from under or overflowing, a feedback mechanism must be implemented to adjust the average coded bit rate as a function of the buffer size and fullness. For example, the average coded bit rate may be lowered by increasing the degree of quantization applied to the DCT coefficients. This reduces the number of bits generated by the variable-length coding, but increases distortion in the decoded image. The decoder must also have a buffer between the transmission channel and the variable rate input to the decoding process. The size of the buffers in the coder and decoder must be the same.

MPEG-2 defines the maximum decoder (and hence coder) buffer size, although the coder may choose to use only part of this. The delay through the coder and decoder buffer is equal to the buffer size divided by the transmission channel bit rate. For example, an MPEG-2 coder operating at 6 Mbit/s with a buffer size of 1.8 Mbits would have a total delay through the coder and decoder buffers of around 300 ms. Reducing the buffer size will reduce the delay, but may affect picture quality if the buffer becomes too small to accommodate the variation in bit rate from the coder VLC.

Most MPEG implementations contain a pre filter to improve video quality by reducing artifacts caused by noise in the input signal. The amount of filtering is critical, as excessive filtering will degrade the resultant image. Most implementations of the pre filter depend on a feedback mechanism to minimize such degradation.

Figure 4:
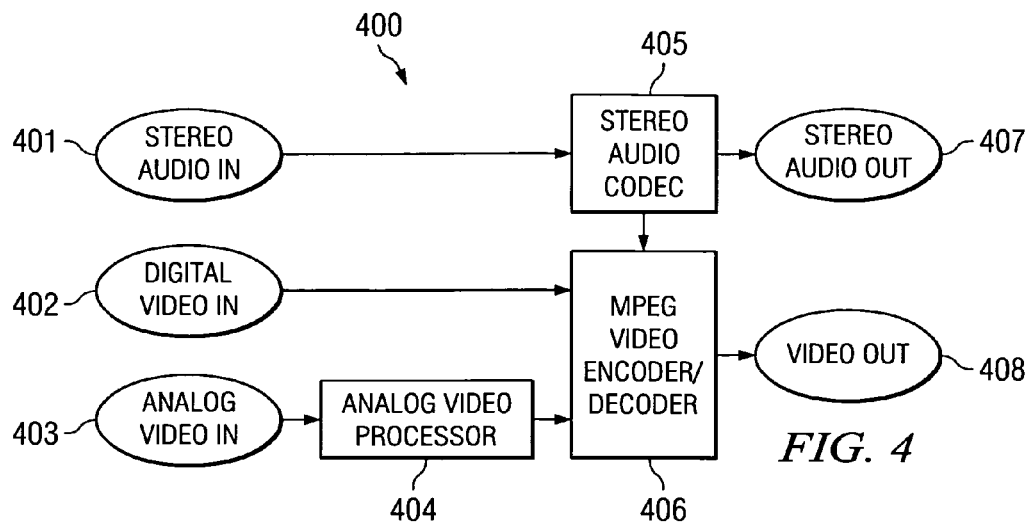
FIG. 4 is a block diagram of a digital video system to which this invention is applicable.

FIG. 4 is a block diagram of a system to which this invention is applicable. The preferred embodiment is a DVD recorder or a DVD player/recorder where the pre filter of this invention is employed to improve the recorded video quality.

System 400 receives digital video data through input block 402. The digital video data may originate from a satellite receiver, digital cable interface, digital video camera or other sources. Alternately, analog video data from a VCR, analog video camera, analog cable interface or other sources may be supplied to input block 403. In this case, the analog video is digitized in analog video processor block 404. In either case, the resultant digital video signal is further processed by MPEG video encoder/decoder block 406. This processing may optionally comprise of decryption of the data stream, authorization of conditional access to the date, decompression of the MPEG compressed data stream, audio/video synchronization by interaction with stereo audio decoder block 405, color space conversion to/from YUV, RGB, component and composite video streams, and other functions. The resulting video streams are output through block 408 for display, storage or further processing.

Optionally separate mono or stereo audio signals may be supplied to stereo audio codec 405 through stereo audio input 401. The resultant processed audio as well as the audio processed by MPEG video encoder/decoder 606 may be output through block 407.

Figure 5:
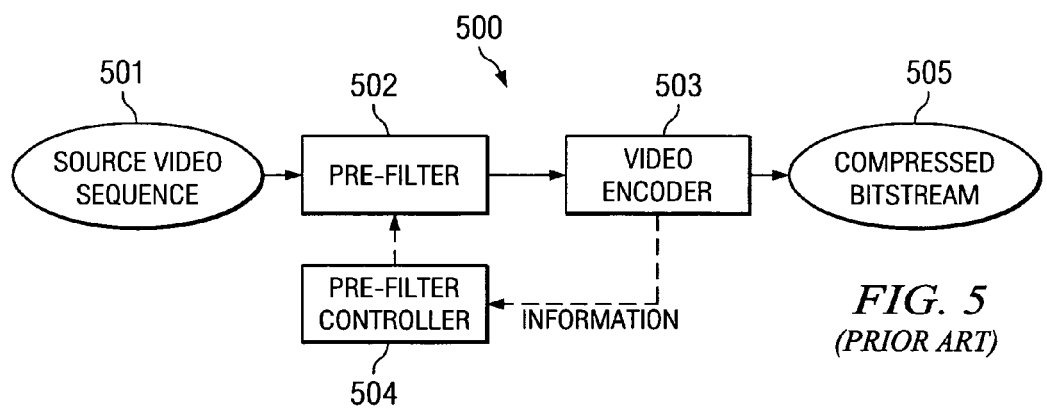
FIG. 5 is a block diagram of one implementation of a pre filter as known in the prior art.

FIG. 5 demonstrates one implementation known in the prior art. As shown in the block diagram, source video 501 is input to the adjustable pre filter block 502. The output of the pre filter block is the input to the video encoder block 503, whose output is the compressed bitstream 505. The encoder also outputs control information to the pre filter control block 504. The information provided to the control block may be one or more of the following:

Global Complexity Measure (GCM) as defined in the MPEG-2 test model 5. GCM represents the estimated degree of difficulty of encoding the picture, Degree of over and/or under generation of encoded bits, Sum or average of the absolute residual error after motion compensation in the encoder, and Spatial activity of the image as determined during the motion compensation step in the encoder.

The average size of the Motion vectors calculated by the encoder.

Using the supplied information, the pre filter controller attempts to estimate the quality of the encoded image. The estimate is calculated using a considerably simplified theoretical model of the encoder in order to reduce computational complexity. The information used to control the pre filter is derived from arbitrary estimates from the encoding process only, without taking into effect the quality of the decoded image, resulting in a sub optimal control algorithm.

Figure 6:
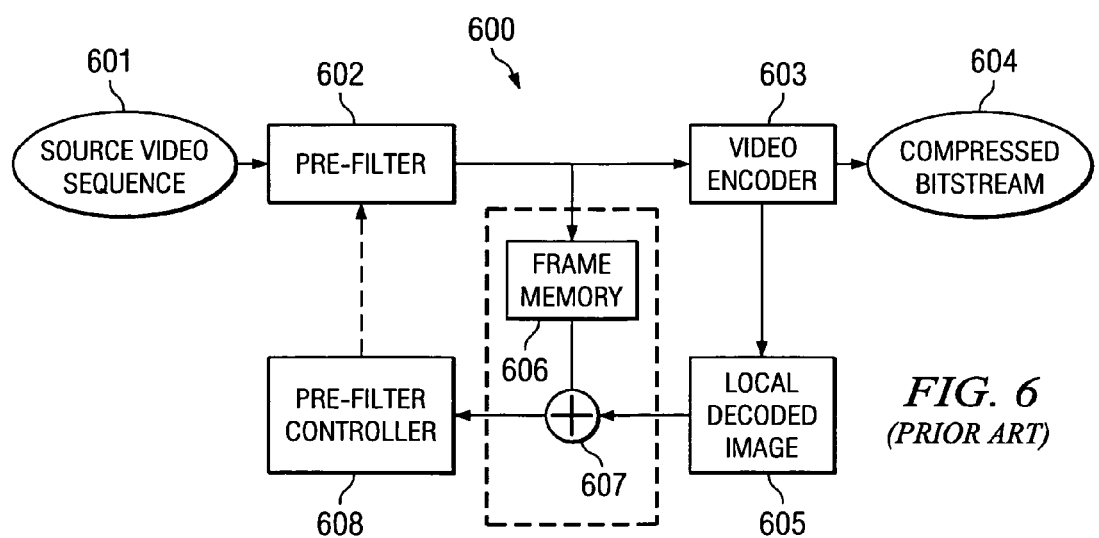
FIG. 6 is a block diagram of a different implementation of the pre filter as known in the prior art.

A different embodiment known in the prior art is shown in FIG. 6. In this approach, the video source 601 is input to the controllable pre filter block 602, and to the input of frame memory block 606. The output of block 602 is connected to the input of the video encoder block 603, whose output is the compressed bit stream 604. Video encoder block 603 also generates a local decoded image in block 605.

The said local decoded image is compared with the output of the frame memory block 606, using comparator block 607. The results of the comparison are supplied to pre filter controller block 608, which block then generates control information supplied to pre filter block 602.

This implementation directly observes picture quality by comparing the image after encoding with the corresponding image before encoding. In typical implementations, the pre filter controller uses the Peak Signal to Noise Ratio. (PSNR) generated by comparator block 607.

Since this implementation directly observes picture quality, it is free from estimation errors. It does this at the expense of additional complexity in calculating the PSNR or other representations of objective picture quality. There is also a requirement for an additional full frame memory to store the original image.

Generating the local decoded image does not increase complexity, as this function is incorporated in the MPEG encoding process.

Figure 7:
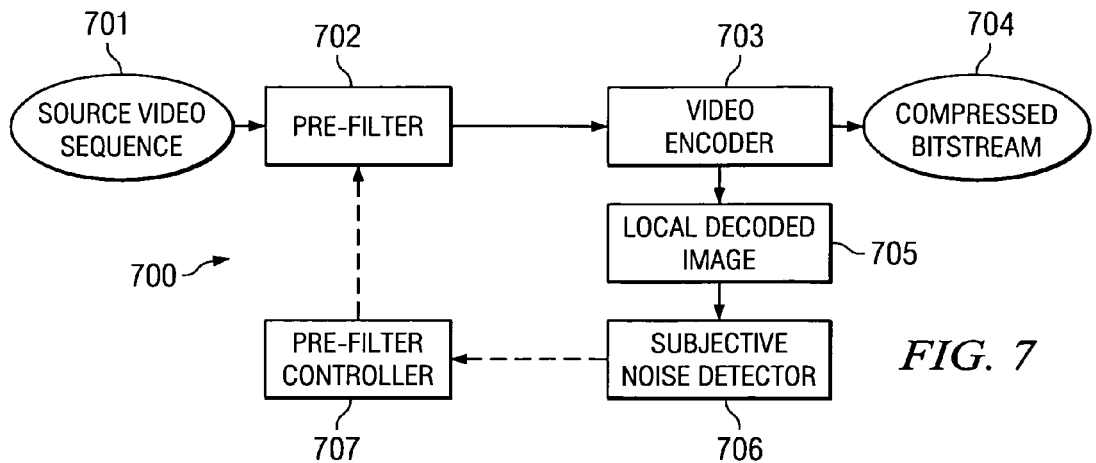
FIG. 7 is a block diagram of the pre filter described in this invention.

FIG. 7 is a block diagram illustrating an embodiment of this invention. Video source 701 is input to the pre-filter block 702. The output of block 702 is the input to video encoder block 703, and the output of block 703 is the compressed bit stream 704. Video encoder block 703 also generates a local decoded image in block 705. This local decoded image is processed by subjective noise detector 706, further described in FIG. 8. The output of subjective noise detector block 706 is input to pre filter controller 707 which is further described in FIG. 9. Block 707 generates the control information supplied to pre filter 702 to adjust the filter characteristics.

This implementation directly observes picture quality by using the locally decoded image generated by the MPEG encoder. However, instead of comparing the locally decoded image with a reference image, the invention employs a subjective noise detector. It detects the presence of encoding artifacts that have a great influence on subjective video quality. Some of these artifacts are blocking noise, ringing noise and/or mosquito noise. Artifacts that do not directly decrease the subjective visual quality are ignored. Since the subjective noise is derived from the image generated by the local decoder, an additional frame memory to store a reference image is not required.

Figure 8:
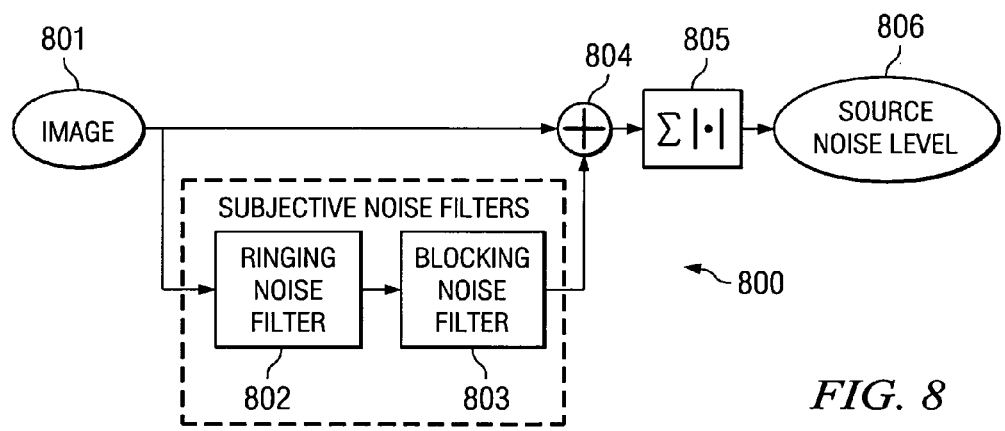
FIG. 8 is a block diagram of one implementation of the subjective noise detector employed in this invention.

FIG. 8 shows an example implementation of the subjective noise detector. Here the local decoded image 801 is input to the filter block 802. Block 802 may contain various filter elements optimized to remove specific artifacts such as blocking noise and ringing noise in the example shown. The output of filter block 802 is then subtracted from the input image 801 in block 804, and the absolute sum of the resulting error is computed in block 805. The output of block 805 is the subjective noise level 806.

Figure 9:
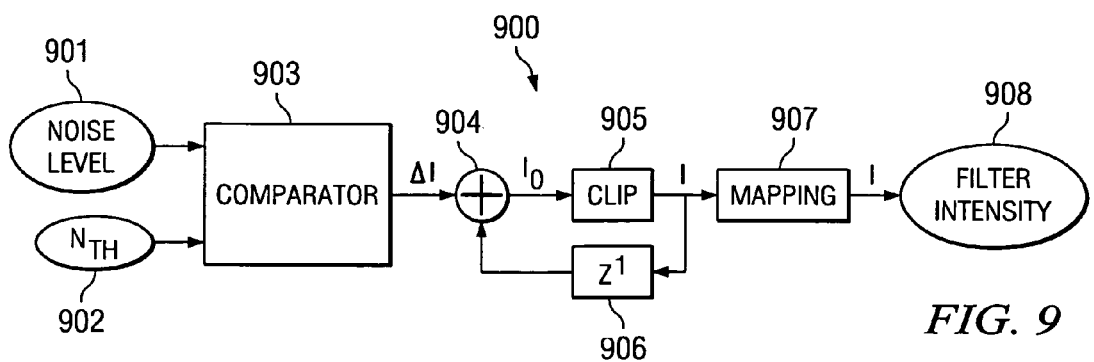
FIG. 9 is a block diagram of one implementation of the pre filter controller employed in this invention.

FIG. 9 shows an implementation of the pre filter controller. The inputs to comparator 903 are the subjective noise level 901 and the noise threshold 902. The output of comparator block 903 is the delta filter intensity desired. If the subjective noise level is less than the threshold, the filter intensity is decreased to increase the sharpness of the image. If the subjective noise level is greater than the threshold, the filter intensity is increased to remove more high frequency components. The resultant filter intensity signal is clipped to a determined range in block 905. A negative feedback signal is generated in block 906 and is applied to block 904 in order to introduce a small amount of hysteresis to eliminate hunting near the threshold.

The controllable pre-filter may be implemented as a continually adjustable filter, or as a plurality of predefined filters. In the case of multiple filters block 907 is used to map the continuous error signal into discrete steps used to select the appropriate filter element. The output of mapping block 907 is the filter intensity signal 908 used to control pre filter 702 of FIG. 7.

The use of a subjective noise detector as shown in this invention gives excellent results in improving picture quality with a minimum of additional complexity. The subjective noise is calculated from the locally decoded image that is always present as part of the MPEG encoding process, and there is no requirement for an additional frame buffer. Most applications such as consumer video recorders already have a noise filter implemented. This filter may be modified to implement this invention without adding significant complexities.

What is claimed is:

1. A computer-implemented method of filtering a digital video signal comprising the steps of:

applying a low pass filter with an adjustable cut-off frequency to the digital video signal;

encoding the output of the said filter;

generating a locally decoded video image as part of the encoding process;

applying a subjective noise detector to the locally generated video image wherein said detector consists of one or more noise filters, and calculates the sum of the absolute differences between the locally generated video image and the output of the said filters;

applying a pre filter controller to the output of the subjective noise detector wherein said controller compares the output of the subjective noise detector with a predetermined threshold with the difference being an error signal employed to adjust the cut-off frequency of the adjustable low pass filter.

2. The method of claim 1, wherein:

said adjustable low pass filter is comprised of a plurality of individual filters with differing cut-off frequencies.

3. The method of claim 1, wherein:
said pre filter controller maps the continuous error signal into control signals to select the appropriate discrete filter.

4. The method of claim 1, wherein:
said pre filter controller introduces a controlled amount of hysteresis into the mapping function to eliminate hunting near the threshold.

5. The method of claim 1, wherein:
said subjective noise detector consists of one or more noise filters wherein each filter is optimized to recognize a particular type of video artifact.

6. The method of claim 1, wherein:
Said subjective noise detector consists of one or more noise filters wherein each filter is optimized to recognize blocking noise, ringing noise or mosquito noise.

7. A digital video apparatus comprising:
A source of a digital video signal;
A digital signal processor connected to said source of a digital video signal programmed to perform filtering on the digital video signal by
applying a low pass filter with an adjustable cut-off frequency to the digital video signal;
encoding the output of the said filter;
generating a locally decoded video image as part of the encoding process;
applying a subjective noise detector to the locally generated video image wherein said detector consists of one or more noise filters, and calculates the sum of the absolute differences between the locally generated video image and the output of the said filters;
applying a pre filter controller to the output of the subjective noise decoder wherein said controller compares the output of the subjective noise detector with a predetermined threshold with the difference being an error signal employed to adjust the cut-off frequency of the adjustable low pass filter; and
an output device connected to the digital signal processor for outputting the filtered digital video signal.

8. The digital video apparatus of claim 7, wherein:
said digital signal processor is programmed to apply an adjustable low pass filter that is comprised of a plurality of individual filters with differing cut-off frequencies.

9. The digital video apparatus of claim 7, wherein:
said digital signal processor is programmed to map the continuous error signal into control signals to select the appropriate discrete filter.

10. The digital video apparatus of claim 7, wherein:
said digital signal processor is programmed to introduce a controlled amount of hysteresis into the mapping function to eliminate hunting near the threshold.

11. The digital video apparatus of claim 7, wherein:
said digital signal processor is programmed to apply said subjective noise detector consisting of one or more noise filters wherein each filter is optimized to recognize a particular type of video artifact.

12. The digital video apparatus of claim 7, wherein:
said digital signal processor is programmed to apply said subjective noise detector consisting of one or more noise filters wherein each filter is optimized to recognize blocking noise, ringing noise or mosquito noise.

* * * * *